Patented Oct. 14, 1930

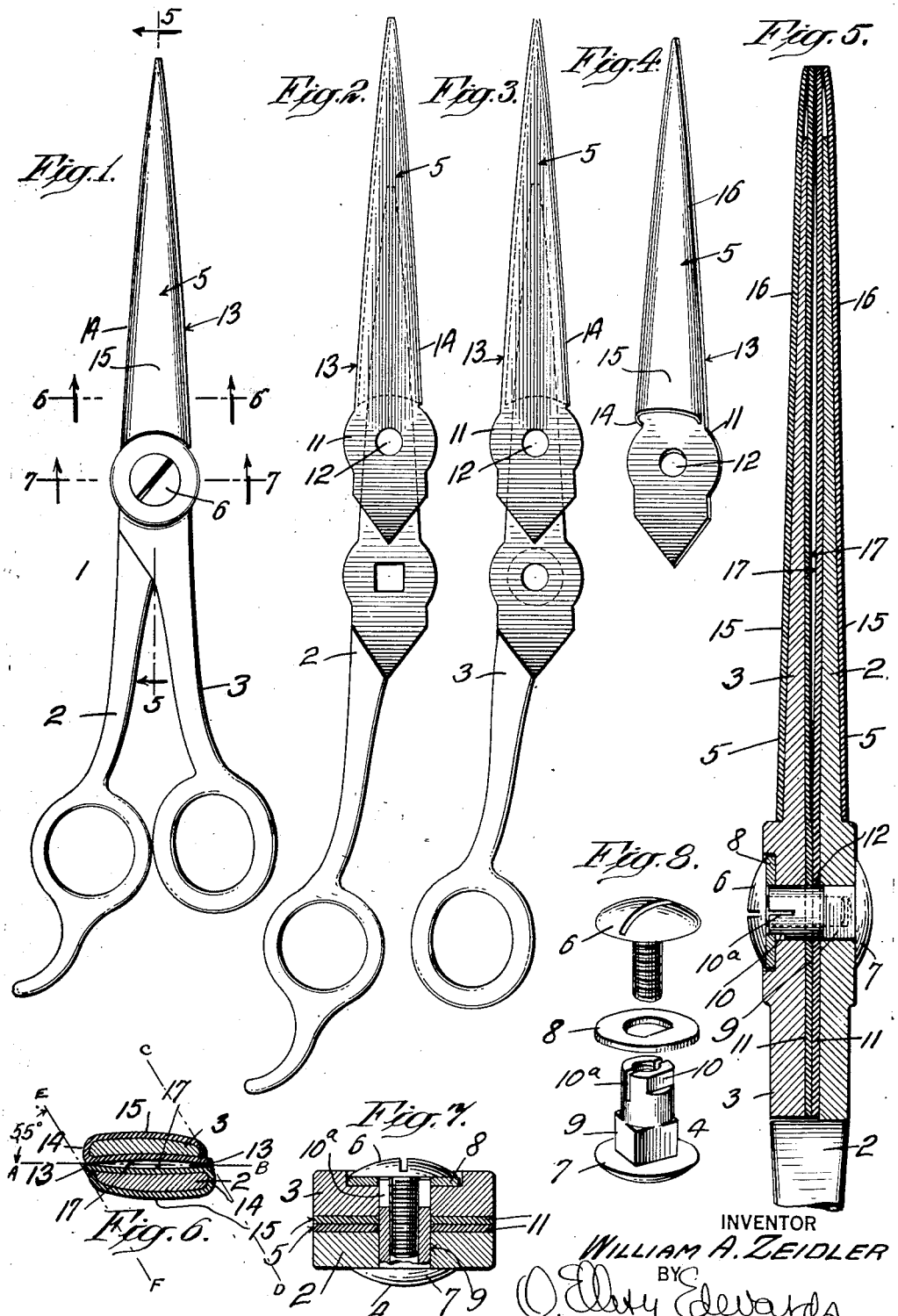

1,778,346

UNITED STATES PATENT OFFICE

WILLIAM A. ZEIDLER, OF NEW YORK, N. Y., ASSIGNOR TO HURLBURT RESEARCH CORPORATION, OF NEW YORK, N. Y., A CORPORATION OF DELAWARE

SCISSORS

Application filed September 23, 1925. Serial No. 58,031.

The object of my invention is to provide a pair of scissors in which the cutting edges will be removable and also to provide an improved pivot which will always hold the cutting edges in proper relation. This and other objects are accomplished by my invention, one embodiment of which is hereinafter more particularly set forth.

For a more detailed description of my invention, reference is to be had to the accompanying drawings, forming a part hereof, in which Figure 1 is a plan view of a closed pair of scissors embodying my invention.

Figures 2 and 3 show the respective scissor elements with blades partially removed.

Figure 4 is a perspective view of a removable blade.

Figure 5 is an enlarged view on the line 5—5 of Figure 1.

Figure 6 is a distorted view on the line 6—6 of Figure 1, showing the fold over of the blades but not showing them ground.

Figure 7 is a cross sectional view taken on the line 7—7 of Figure 1.

Figure 8 is a perspective view of the pivot with parts separated.

Throughout the various views of the drawings, similar reference characters designate similar parts.

My improved scissors 1 is composed of two scissor elements 2 and 3, respectively, which are connected together by a pivot 4 and each scissor element is provided with a removable blade 5. The elements 2 and 3 may be given any desired shape and made in any convenient size, according to the work required of them. In the embodiment shown is disclosed a pair of scissors suitable for a barber's use when cutting hair.

The pivot 4 is composed of a screw 6, a nut 7 and a washer 8. The nut is preferably made with a square part 9 that fits a corresponding opening in the scissor element 2 so that the nut must turn with this element. Beyond this the nut 7 has a cylindrical surface, except at its extreme outer edge, where it is flattened, as indicated at 10. It is also slotted at 10ª, as shown in Figure 8. The washer 8 fits this cylindrical surface and this flattened portion so that it is impossible for the washer to turn on the nut. The washer 8 rests in a corresponding recess in the element 3 and can turn freely therein. The screw 6 passes into the nut 7 and holds the parts, as indicated in Figure 2, so that no matter how much the scissor elements may turn one on the other about the pivot 4, the screw 6 will not become loose, but may be tightened any desired amount according to the tension which is desired so that the scissor elements 2 and 3 may be moved about the pivot against any desired resistance. The head of the screw 6 forces the washer down on the nut 7 and thereby causes the walls of the slot 10ª to slightly approach each other and then the nut locks the screw.

The blades 5 fit over the ends of the parts 2 and 3 which are correspondingly shaped and each blade is provided with a base 11 with a perforation 12 through which the cylindrical part of the nut 7 is passed so as to secure the blades in place. One edge 13 of the base 11 is a cutting edge and the other edge of this base extends laterally from the base 11, as indicated at 14, and thence it is bent again on a convex curved line until substantially parallel with the base 11, as indicated at 15, and thereafter it is bent downwardly at 16 until its edge is close to the cutting edge 13 all of which is clearly indicated in Figures 4 and 6, and the blade 5, when thus made, fits snug on the scissor element to which it is attached. Figure 6, merely shows the form of bending of the blade in exaggerated form, to more closely exemplify the arch and support for the base of the blade at its cutting edge, although the cutting edge, which is normally ground at an angle of some 55° from the horizontal, is not indicated in this Figure 6. Of course, it must be assumed that the cutting edge is a ground sharp edge and when so ground, the down turned portion of the arch 16, will likewise be ground away so that the arch will form a support directly at the ground cutting edge of the base part. By having this snug fit, the elements 2 and 3 are greatly strengthened and reinforced so that it is possible to make them out of lighter and weaker material than would otherwise be possible. Furthermore, the curving of the back of the blade, as above described, greatly strengthens the blade because a molecular displacement of the steel in the blade is caused by the die so that the blade, when bent as above described, is exceedingly rigid. The surface of the blade 11, which is remote from the scissor element, is hollow ground, as indicated at 17 in Figure 6. It will be noted that the portion of the blade which is turned down adjacent to the cutting edge thereof forms a direct arch over the base of the blade, giving all the advantageous features of strength of an arch and at the same time, this down turned edge gives a support for the thin cutting edge throughout its length.

In view of the foregoing the use of my improved scissors will be readily understood. The instrument is used as scissors are always used and for any desired purpose and when the blades become dull the screw 6 is removed and so is the nut 7 and thereby the pivot 4 is removed and then the blades 5 can be withdrawn and new blades substituted and thereafter the parts are reassembled. Suitable tension is at all times preserved by adjusting the screw 6, as above set forth.

While I have shown and described one embodiment of my invention, it is obvious that it is not restricted thereto, but that it is broad enough to cover all structures that come within the scope of the annexed claims.

Having thus described my invention, what I claim is:

1. A pair of scissors comprising two scissors elements susceptible of receiving removable blades, each blade being formed from a sheet metal bent to provide a concave face portion along the line of its cutting edge and having a convex part extending from and over the base whereby it may be applied to the scissors elements, said convex portion of the removable blade bent down at a short angle to meet the cutting edge of the blade, thereby reenforcing the blade at its cutting edge.

2. A pair of scissors consisting of two scissors elements connected by a pivot, each element having a concave surface and a convex surface to receive a removable blade, each blade having a substantial flat base portion extending between the scissors elements and perforated to be held by the pivot thereof, each removable blade beyond the pivot engagement provided with a base portion and a bent over outer portion enclosing the scissors element and with the bent over outer portion turned down adjacent to the cutting edge of the blade for supporting said edge of the blade throughout its length.

3. A removable blade for scissors formed from a sheet metal and having a base portion for engaging scissors elements and also having a cutting edge at one side of the base part of the sheet of metal, an integral portion of said sheet bent laterally from and over the base portion and conforming generally to the shape of the base, said bent portion terminating in a down turned support pressing immediately against the base portion adjacent to its cutting edge, the structure thus formed providing a complete enclosure for a scissors element and anchored to said scissors element.

4. A removable blade for scissors consisting of a sheet metal structure having a flat base portion for engagement with a scissors element and an extended concave portion with a cutting edge at one side thereof, said element bent into a convex section conformed to a scissors element, said convex section being turned downward along the line of the cutting edge and forming the reenforce for said cutting edge.

In testimony whereof, I have hereunto set my hand this 17th day of September, 1925.

WILLIAM A. ZEIDLER.